United States Patent
Stoica et al.

(10) Patent No.: US 10,929,229 B2
(45) Date of Patent: Feb. 23, 2021

(54) DECENTRALIZED RAID SCHEME HAVING DISTRIBUTED PARITY COMPUTATION AND RECOVERY

(71) Applicant: International Business Machines Corporation, Armonk, NY (US)

(72) Inventors: Radu I. Stoica, Zurich (CH); Roman A. Pletka, Uster (CH); Ioannis Koltsidas, Zurich (CH); Nikolas Ioannou, Zurich (CH); Antonios K. Kourtis, Zurich (CH); Sasa Tomic, Kilchberg (CH); Charalampos Pozidis, Thalwil (CH); Brent W. Yardley, Hillsboro, OR (US)

(73) Assignee: International Business Machines Corporation, Armonk, NY (US)

(*) Notice: Subject to any disclaimer, the term of this patent is extended or adjusted under 35 U.S.C. 154(b) by 209 days.

(21) Appl. No.: 16/015,054

(22) Filed: Jun. 21, 2018

(65) Prior Publication Data
US 2019/0391877 A1 Dec. 26, 2019

(51) Int. Cl.
*G06F 11/00* (2006.01)
*G06F 11/10* (2006.01)
*G06F 3/06* (2006.01)

(52) U.S. Cl.
CPC ........ *G06F 11/1092* (2013.01); *G06F 3/065* (2013.01); *G06F 3/0619* (2013.01); *G06F 3/0659* (2013.01); *G06F 3/0689* (2013.01)

(58) Field of Classification Search
CPC . G06F 11/1092; G06F 11/1076; G06F 3/0619
See application file for complete search history.

(56) References Cited

U.S. PATENT DOCUMENTS

| 6,826,711 B2 | 11/2004 | Moulton et al. |
| 9,104,334 B2 | 8/2015 | Madhusudana et al. |
| 9,594,633 B2 | 3/2017 | Colgrove et al. |

(Continued)

OTHER PUBLICATIONS

Sathiamoorthy, M. et al., "Xoring elephants: Novel erasure codes for big data," Proceedings of the VLDB Endowment, 2013, vol. 6, No. 5, pp. 325-336.

(Continued)

*Primary Examiner* — Philip Guyton
(74) *Attorney, Agent, or Firm* — Zilka-Kotab, P.C.

(57) ABSTRACT

A computer-implemented method, according to one embodiment, includes: receiving a write request at a storage system which includes more than one storage device, determining a storage location for data included in the write request, and determining a storage location for parity information corresponding to the data included in the write request. A first copy of the data included in the write request is sent to a first storage device which corresponds to the storage location for the data included in the write request. Moreover, a second copy of the data included in the write request is sent to a second storage device which corresponds to the storage location for the parity information. One or more instructions to compute the parity information via a decentralized communication link with the remaining storage devices are sent to the second storage device. The first storage device is different than the second storage device.

16 Claims, 10 Drawing Sheets

(56) References Cited

U.S. PATENT DOCUMENTS

| | | | |
|---|---|---|---|
| 9,600,368 B2 | 3/2017 | Bonwick | |
| 9,652,175 B2 | 5/2017 | Vanaraj et al. | |
| 9,659,185 B2 | 5/2017 | Elovici et al. | |
| 9,781,227 B2 | 10/2017 | Friedman et al. | |
| 2004/0059869 A1* | 3/2004 | Orsley | G06F 11/1076 711/114 |
| 2005/0235080 A1* | 10/2005 | El-Batal | G06F 3/0613 710/74 |
| 2016/0371145 A1 | 12/2016 | Akutsu et al. | |
| 2017/0262202 A1* | 9/2017 | Seo | G06F 3/0619 |
| 2017/0308437 A1 | 10/2017 | Usvyatsky et al. | |

OTHER PUBLICATIONS

Kim et al., "Chip-level raid with flexible stripe size and parity placement for enhanced ssd reliability", 2015, IEEE Transactions on Computers, 65(4), pp. 1116-1130.

Sathiamoorthy et al., "XORing Elephants: Novel Erasure Codes for Big Data," Proceedings of the VLDB Endowment, 2013, vol. 6, No. 5, pp. 325-336.

Kim et al., "Chip-Level Raid with Flexible Stripe Size and Parity Placement for Enhanced SSD Reliability," IEEE Transactions on Computers, vol. 65, No. 4, Apr. 2016, pp. 1116-1130.

Kim et al., "Chip-Level Raid with Flexible Stripe Size and Parity Placement for Enhanced SSD Reliability," Flash Memory Summit, 2015, pp. 1-32.

\* cited by examiner

DECENTRALIZED RAID SCHEME HAVING DISTRIBUTED PARITY COMPUTATION AND RECOVERY

BACKGROUND

The present invention relates to data storage systems, and more specifically, this invention relates to data storage systems which implement a decentralized redundant array of independent disks (RAID) scheme.

Conventional storage systems typically rely on a centralized storage controller that receives and distributes input/output (I/O) requests across an array of storage devices. The storage controller is primarily responsible for distributing data across the storage devices, for implementing various data redundancy schemes, and for transparently reconstructing lost data in the event of a storage device failure. However, such architectures have limitations which have become problematic, particularly as achievable data rates of storage devices as well as the number of storage devices attached to a centralized storage controller continue to increase.

For instance, the centralized storage controller is faced with supporting an increasingly high I/O rate and bandwidth in order to saturate each of the storage devices connected thereto simultaneously. For example, in a storage system having 10 solid state devices (SSDs), each capable of sustaining a 1 GB/s bandwidth and 100,000 I/Os, the storage controller would need to support a bandwidth of 10 GB/s and 1,000,000 I/Os. Accordingly, conventional products which implement a storage array having too many storage devices cause the storage controller to become a bottleneck which limits the number of drivers that can efficiently operate in the storage system.

Conventional storage controllers also typically include customized hardware which incorporates specially designed field-programmable gate arrays (FPGAs), application-specific integrated circuits (ASICS), boards/circuits, etc., in order to reach corresponding performance targets. However, the customized hardware greatly affects the development speed of a storage appliance product implementing such conventional storage controllers, increases the development costs, and significantly limits the flexibility to continuously optimize or reuse the controller in a different environment. As a result, the development challenges make it hard for storage vendors to adapt and stay competitive in a market where technology improves at a fast pace.

SUMMARY

A computer-implemented method, according to one embodiment, includes: receiving a write request at a storage system which includes more than one storage device, determining a storage location for data included in the write request, and determining a storage location for parity information corresponding to the data included in the write request. A first copy of the data included in the write request is sent to a first storage device which corresponds to the storage location for the data included in the write request. Moreover, a second copy of the data included in the write request is sent to a second storage device which corresponds to the storage location for the parity information. One or more instructions to compute the parity information via a decentralized communication link with the remaining storage devices are also sent to the second storage device. Furthermore, the first storage device is different than the second storage device.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: receiving, by the processor, a write request at a storage system which includes more than one storage device; determining, by the processor, a storage location for data included in the write request; and determining, by the processor, a storage location for parity information corresponding to the data included in the write request. A first copy of the data included in the write request is sent, by the processor, to a first storage device which corresponds to the storage location for the data included in the write request. Moreover, a second copy of the data included in the write request is sent, by the processor, to a second storage device which corresponds to the storage location for the parity information. One or more instructions to compute the parity information via a decentralized communication link with the remaining storage devices are also sent, by the processor, to the second storage device. Furthermore, the first storage device is different than the second storage device.

A computer-implemented method, according to yet another embodiment, includes: receiving a write request at a first storage device. The first storage device is in communication with a switching mechanism and a plurality of other storage devices. A storage location in a second storage device is determined for parity information which corresponds to data included in the write request. The second storage device is one of the plurality of other storage devices in communication with the first storage device. Moreover, a copy of the data included in the write request is sent to the second storage device. One or more instructions to compute the parity information via a decentralized communication link with the first storage device and the remaining storage devices are also sent to the second storage device. The data included in the write request is stored in memory of the first storage device, however the first storage device does not store any parity information which corresponds to the data included in the write request.

Other aspects and embodiments of the present invention will become apparent from the following detailed description, which, when taken in conjunction with the drawings, illustrate by way of example the principles of the invention.

DETAILED DESCRIPTION

Figure 1:
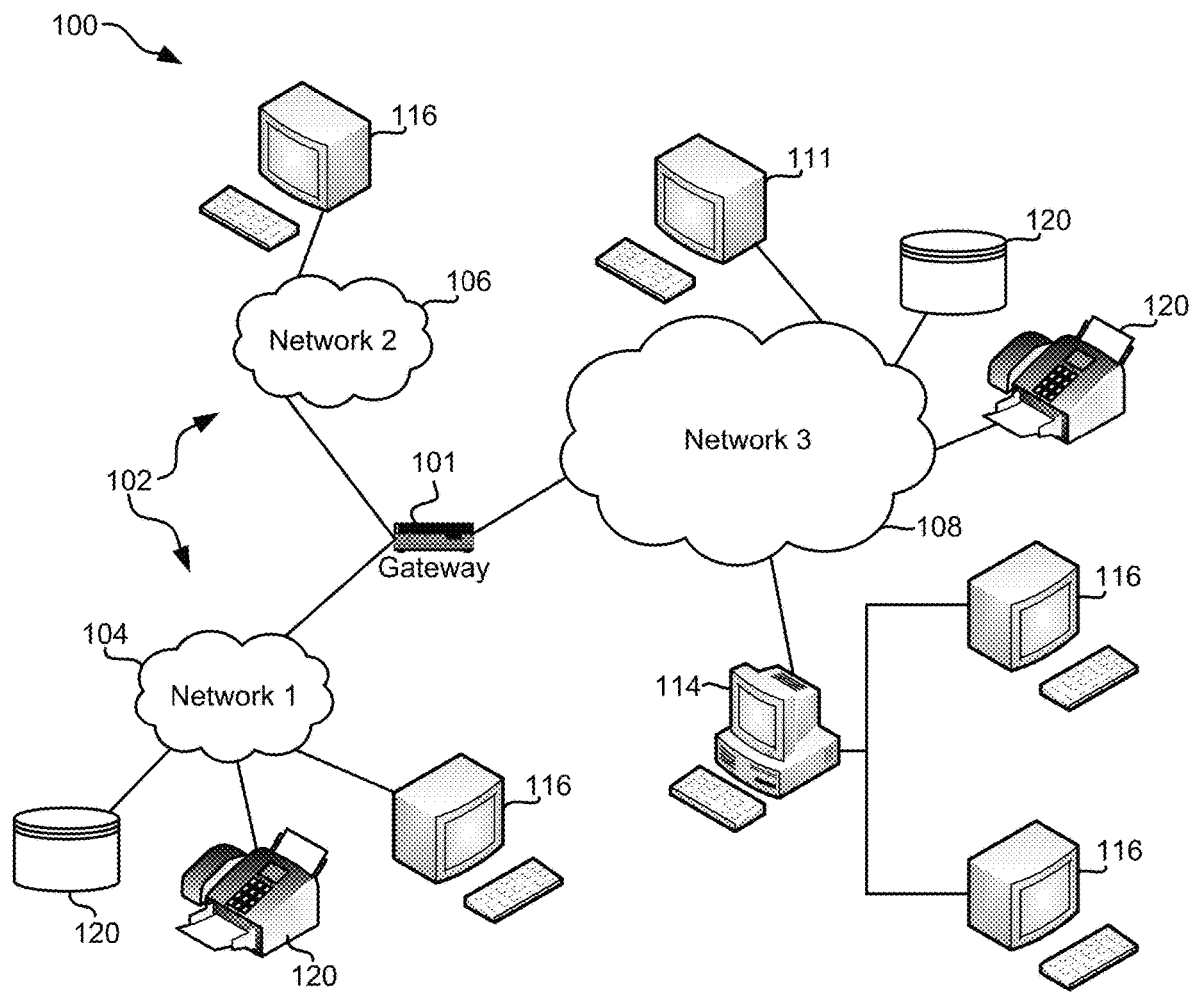
FIG. 1 is a representative view of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an" and "the" include plural referents unless otherwise specified. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products which implement decentralized storage systems without implementing centralized parity calculations in storage controllers. As a result, various ones of the embodiments included herein are able to achieve storage systems having higher aggregate performance while also desirably accomplishing lower costs per GB and per I/O, e.g., as will be described in further detail below.

In one general embodiment, a computer-implemented method includes: receiving a write request at a storage system which includes more than one storage device, determining a storage location for data included in the write request, and determining a storage location for parity information corresponding to the data included in the write request. A first copy of the data included in the write request is sent to a first storage device which corresponds to the storage location for the data included in the write request. Moreover, a second copy of the data included in the write request is sent to a second storage device which corresponds to the storage location for the parity information. One or more instructions to compute the parity information via a decentralized communication link with the remaining storage devices are also sent to the second storage device. Furthermore, the first storage device is different than the second storage device.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: receiving, by the processor, a write request at a storage system which includes more than one storage device; determining, by the processor, a storage location for data included in the write request; and determining, by the processor, a storage location for parity information corresponding to the data included in the write request. A first copy of the data included in the write request is sent, by the processor, to a first storage device which corresponds to the storage location for the data included in the write request. Moreover, a second copy of the data included in the write request is sent, by the processor, to a second storage device which corresponds to the storage location for the parity information. One or more instructions to compute the parity information via a decentralized communication link with the remaining storage devices are also sent, by the processor, to the second storage device. Furthermore, the first storage device is different than the second storage device.

In yet another general embodiment, a computer-implemented method includes: receiving a write request at a first storage device. The first storage device is in communication with a switching mechanism and a plurality of other storage devices. A storage location in a second storage device is determined for parity information which corresponds to data included in the write request. The second storage device is one of the plurality of other storage devices in communication with the first storage device. Moreover, a copy of the data included in the write request is sent to the second storage device. One or more instructions to compute the parity information via a decentralized communication link with the first storage device and the remaining storage devices are also sent to the second storage device. The data included in the write request is stored in memory of the first storage device, however the first storage device does not store any parity information which corresponds to the data included in the write request.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
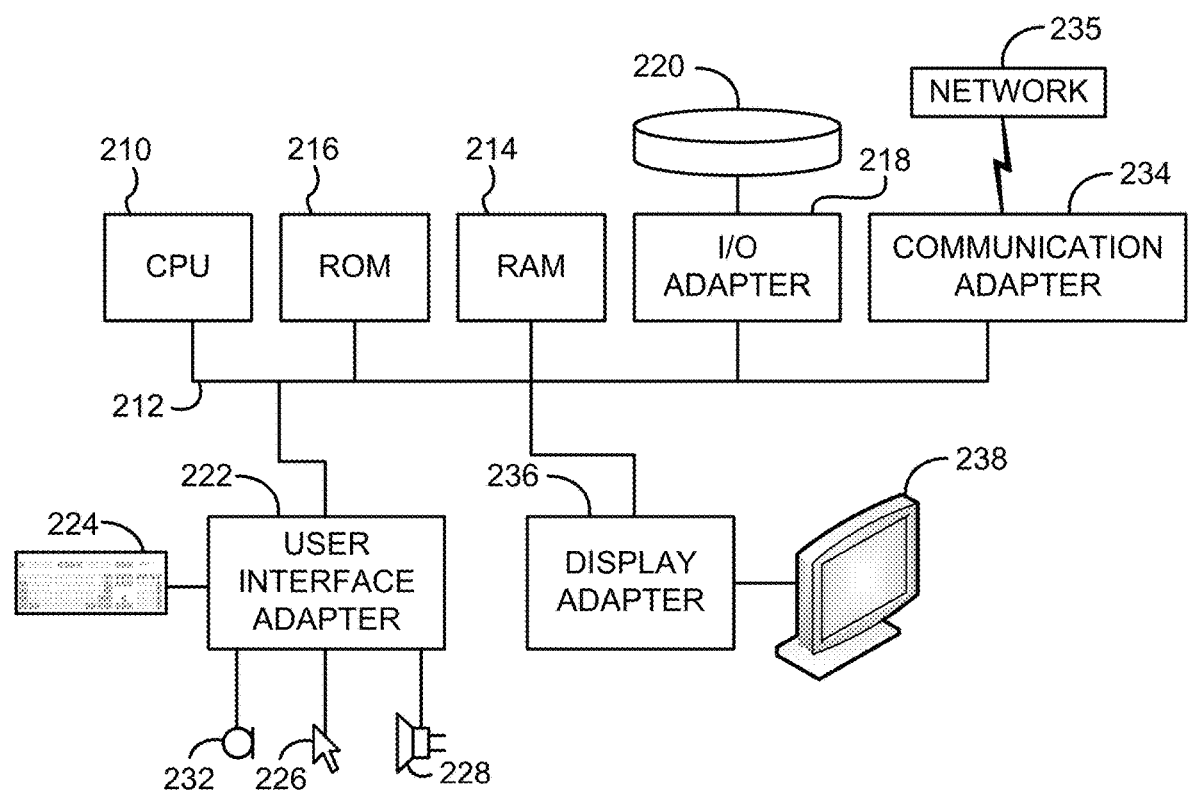
FIG. 2 is a representative view of a hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a processor system having a central processing unit 210, such as a microprocessor, and a number of other units interconnected via a system bus 212.

The processors system shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the processor system to a communication network 235 (e.g., a data processing network) and a display adapter 236 for connecting the bus 212 to a display device 238.

The processor system may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
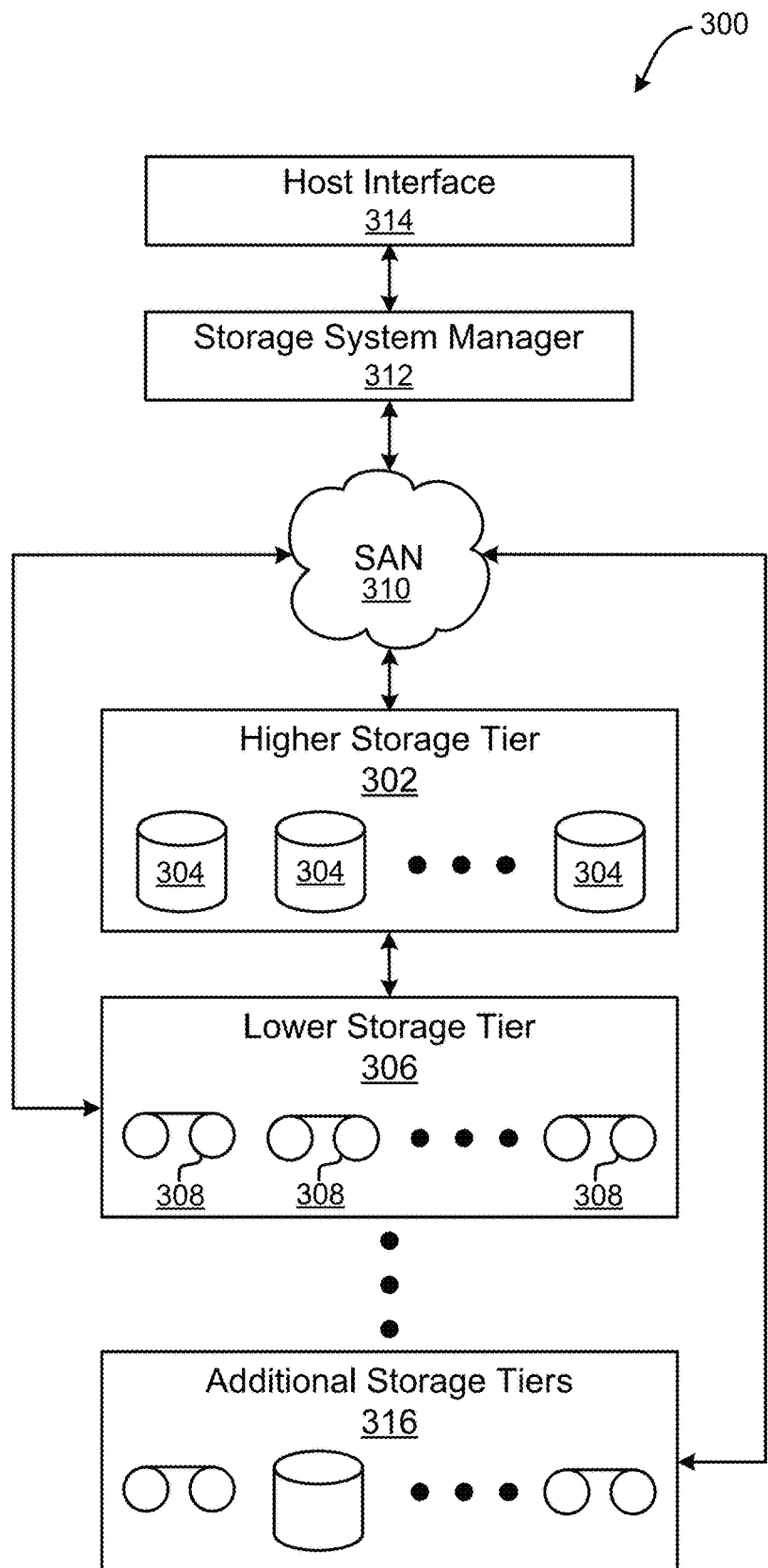
FIG. 3 is a representative view of a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in SSDs, Flash memory, SSD arrays, Flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, conventional storage systems such as storage area networks (SANs) and network-attached storage (NAS) typically rely on a centralized storage controller that receives and distributes I/O requests across an array of storage devices. Such conventional storage controllers are primarily responsible for distributing data across the storage devices, implementing various data redundancy schemes, and transparently reconstructing lost data. However, such architectures have limitations which have become problematic, particularly as achievable data rates continue to increase.

For instance, the centralized storage controller is faced with supporting an increasingly high I/O rate and bandwidth in order to saturate each of the storage devices connected thereto simultaneously. For example, in a storage system having 10 SSDs, each capable of sustaining a 1 GB/s bandwidth and 100,000 I/Os, the storage controller would be forced to support a bandwidth of 10 GB/s and 1,000,000 I/Os. Accordingly, conventional products which implement a storage array having too many storage devices cause the storage controller to become a bottleneck which limits the number of drivers that can efficiently operate in the storage system.

Conventional storage controllers also typically include customized hardware which incorporates specially designed FPGAs, ASICS, boards/circuits, etc., in order to reach corresponding performance targets. However, the customized hardware greatly affects the development speed of a storage appliance product implementing such conventional storage controllers, increases the development costs, and significantly limits the flexibility to continuously optimize or reuse the controller in a different environment. As a result, the development challenges make it hard for storage vendors to adapt and stay competitive in a market where technology improves at a fast pace.

Furthermore, the presence of a conventional centralized storage controller causes scaling of the storage system to become uneconomical. This is particularly true for less demanding workloads which involve a lower capacity and/or reduced performance. Conventional storage controllers are inelastic components of the storage system and represent a fixed cost irrespective of the number of storage devices or aggregate bandwidth utilized. Accordingly, the net effect is that the cost of one GB of storage (or similarly the cost of one I/O) is significantly higher for smaller storage configurations having fewer storage devices compared to larger storage configurations having more storage devices. Further still, the presence of a centralized storage controller in conventional products decreases the level of compression achievable in the storage devices for RAID schemes based on erasure coding (e.g., RAID 5, RAID 6), as the erasure codes (parity blocks) computed by the storage controller are typically less compressible compared to the original data.

In sharp contrast, various ones of the embodiments included herein are able to effectively eliminate performing centralized parity calculations, thereby achieving increased performance (e.g., increased throughput) while also reducing costs per GB and/or per I/O. These improvements may be accomplished by physically separating the organization of data stripes from the parity calculation, which allows for parity calculations to be distributed to the storage devices themselves. Similarly, parity calculations may be performed directly by the host using a dedicated storage driver, e.g., as will be described in further detail below.

Figure 4A:
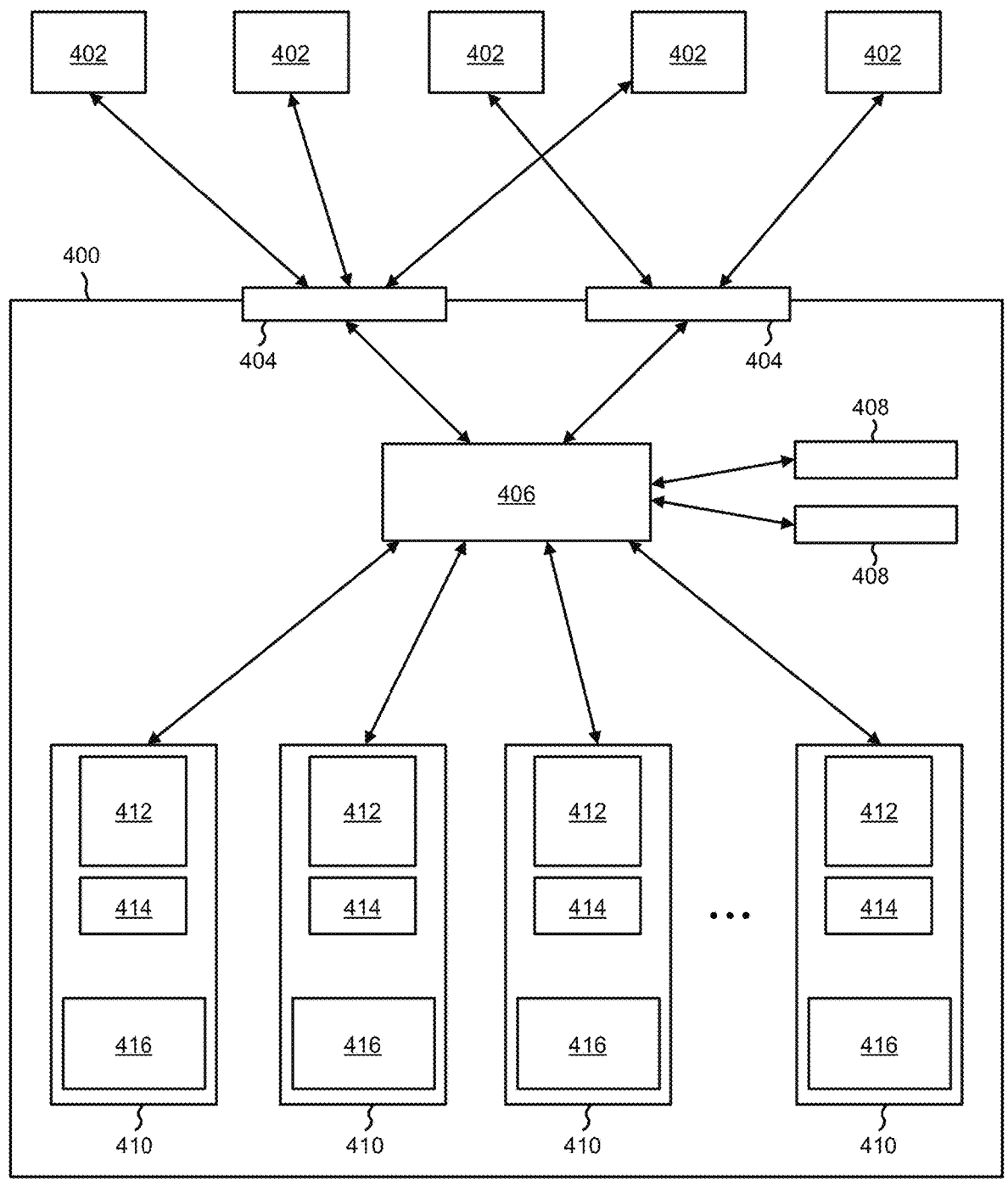
FIG. 4A is a representative view of a decentralized storage system having hosts connected thereto, in accordance with one embodiment.
Figure 4B:
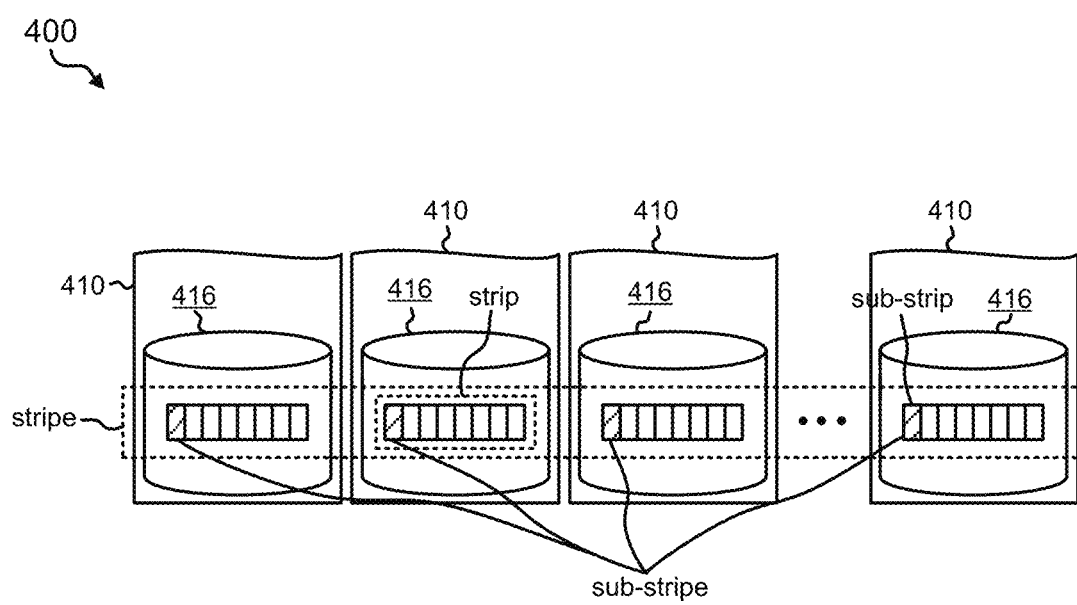
FIG. 4B is a representative view of the organization of data stripes stored in the storage devices in FIG. 4A, in accordance with one embodiment.

Looking to FIGS. 4A-4B, a representative view of the architecture for an exemplary storage system 400 is illustrated in accordance with one embodiment. As an option, the present storage system 400 may be implemented in conjunction with features from any other embodiment listed herein, such as those described with reference to the other FIGS., such as FIGS. 1-3. However, such storage system 400 and others presented herein may be used in various applications and/or in permutations which may or may not be specifically described in the illustrative embodiments listed herein. Further, the storage system 400 presented herein may be used in any desired environment. Thus FIGS. 4A-4B (and the other FIGS.) may be deemed to include any possible permutation. Moreover, it should be noted that the number of each type of component included in the embodiment illustrated in FIGS. 4A-4B is in no way intended to be limiting, but rather has been presented by way of example.

As shown in FIG. 4A, multiple hosts 402 are coupled to interface modules 404 of the storage system 400. Depending on the approach, the hosts 402 may be coupled to one or more interface modules 404 of the storage system 400 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Although not shown, in some approaches one or more of the hosts 402 may be coupled to the interface modules 404 of the storage system 400 over a network of any desired type, e.g., such as a WAN, LAN, SAN, etc.

The interface modules 404 are in turn coupled to a connection management mechanism 406 (e.g., such as a switching mechanism). According to an illustrative approach, the connection management mechanism 406 may be a crossbar switching mechanism. However, the connection management mechanism 406 may include any type of switch which is capable of connecting multiple inputs to multiple outputs, e.g., in a matrix manner as would be appreciated by one skilled in the art after reading the present description.

The connection management mechanism 406 is also coupled to management modules 408. The management modules 408 may be used to perform data recovery procedures in some approaches (e.g., see method 600 below). Using the management modules 408 to perform data recovery procedures in some approaches allows for simplification of the manner in which the storage devices are implemented, while also allowing data recovery to be performed internal to the storage system itself, e.g., as will be described in further detail below.

The connection management mechanism 406 is also coupled to a plurality of storage devices 410. Thus, each of the storage modules 410 are effectively coupled to each other through the connection management mechanism 406. Information, commands, requests, etc., may thereby be sent between the storage modules 410. However, in some approaches two or more of the storage devices 410 may be coupled to each other by a wired and/or wireless connection which enables information to be transferred directly therebetween. For example, two or more of the storage devices 410 may each include a wireless antenna (not shown) which are connected to each other WiFi.

With continued reference to FIG. 4A, each of the storage modules 410 includes a RAID engine 412, at least some RAM 414, and non-volatile memory 416. In preferred approaches the RAM 414 in each of the storage modules 410 is protected against loss resulting from power loss. In other words, the RAM 414 is preferably backed by an alternate power source (e.g., such as a battery) and/or be a type of non-volatile RAM (NVRAM). According to some approaches, the RAM 414 in each of the storage devices 410 may be used in combination with the RAID engine 412 to temporarily store data while parity information is being calculated. According to other approaches, a portion of the RAM 414 in a given storage module 410 may be allocated as a part of performing a write operation in the non-volatile memory 416.

The non-volatile memory 416 included in each of the storage modules 410 may be of any desired type. For instance, the non-volatile memory 416 may include one or more SSDs, HDDs, magnetic tape, optical media, etc., depending on the desired approach. The non-volatile memory 416 may be used to store data as well as parity information. Accordingly, the non-volatile memory 416 may employ local error correction codes and/or locally computed parity information in order to overcome failure events such as flash media errors and flash chip failures.

In some approaches, the non-volatile memory 416 may utilize additional error correction codes that maintain and store additional redundant information such as parity information. This redundant information may be internal to the storage device in that the extra information is computed based on data stored in the storage device. The internal error correction codes and the corresponding redundant information scale created with the number of storage devices 410 are orthogonal and complementary to the RAID scheme across the storage devices. For example, it allows detecting and correcting data corruption locally. Any data loss resulting from an error that cannot be corrected internally may be recovered with the distributed RAID scheme across storage devices. It should be appreciated that various embodiments herein may be implemented with a wide range of RAID-like schemes across the storage devices 410, including for example RAID-4, RAID-5, RAID-6, etc. To provide a context, and solely to assist the reader, various embodiments may be described with reference to a RAID-5 scheme. This has been done by way of example only, and should not be deemed limiting on the invention.

In some approaches, a RAID-like scheme may be implemented across the different storage components in the non-volatile memory 416 of a single storage module 410. In other approaches, a RAID-like scheme may be implemented across the non-volatile memory 416 of multiple storage modules 410. For instance, a log structured array (LSA) based segment may be opened in memory to store data corresponding to a write request received. In yet other approaches, RAID-like schemes may be implemented across different storage components in the non-volatile memory 416 and across the non-volatile memory 416 of multiple storage modules 410. Depending on the approach, the segment may correspond to one or more RAID stripes. Looking to FIG. 4B, for ease of explanation, an LSA segment is illustrated according to an example, as mapping to precisely one RAID "stripe" which extends across the SSD non-volatile memory 416 of the storage modules 410. Moreover, the chunk of data that a RAID stripe stores on a given drive may be referred to as a "strip". Furthermore, the collection of pages that are stored in the same offset across all strips may be referred to as a "sub-stripe". Furthermore, each of the pages in the sub-stripe may be referred to as "sub-strip". It follows that the parity for each sub-stripe may be computed and written independently of all other sub-stripes.

Although various components are illustrated as being included in FIG. 4A, it should be noted that the storage system 400 does not include a centralized storage controller. As mentioned above, conventional products which rely on centralized storage controllers experience performance setbacks, particularly as achievable data rates continue to increase. Rather, the connection management mechanism 406 may be used to direct I/O requests received from the various hosts 402 to the appropriate storage devices 410, e.g., according to any of the processes included in method 500 below.

Figure 5A:
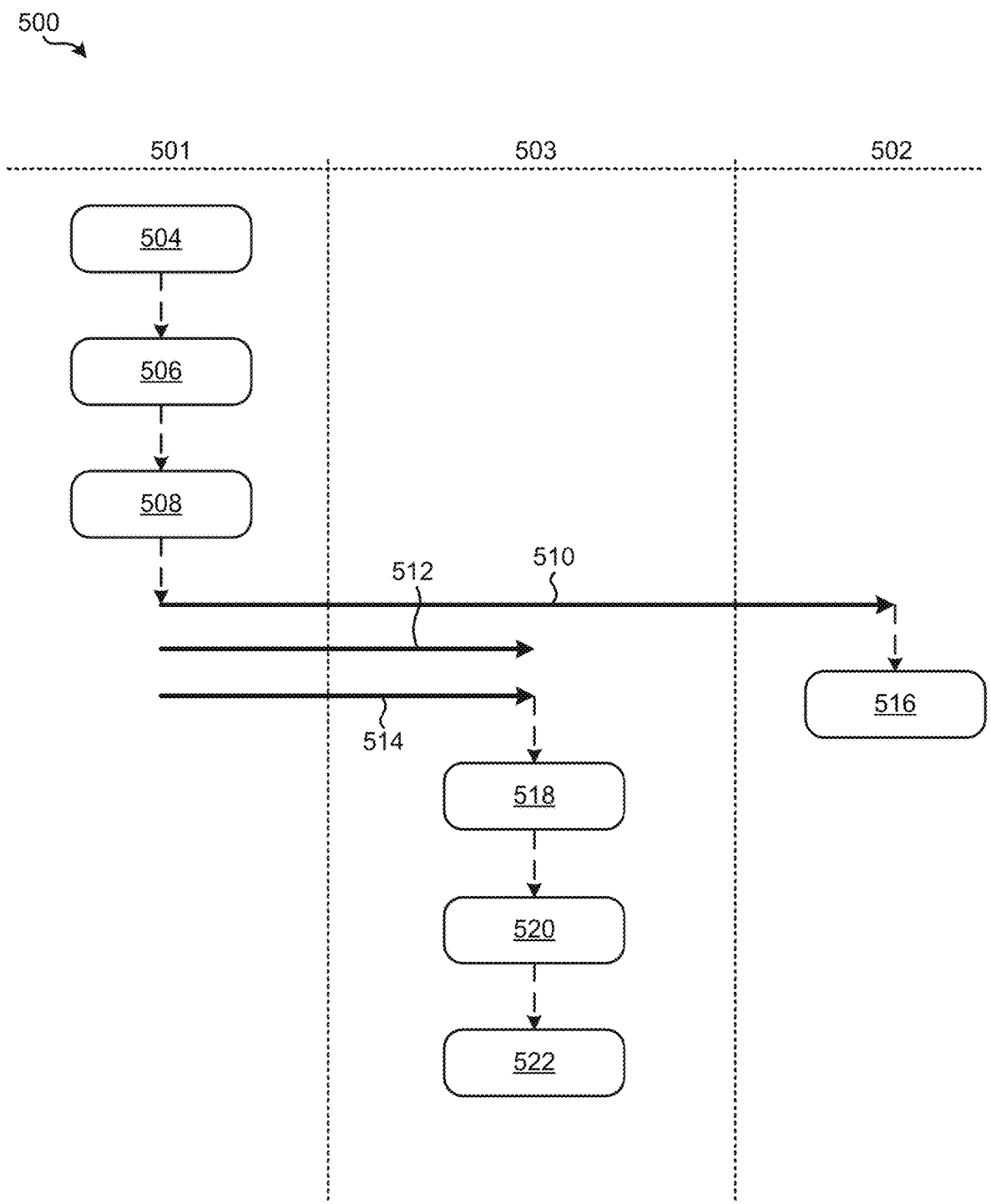
FIG. 5A is a flowchart of a method in accordance with one embodiment.

It follows that the process by which I/O requests are received by the connection management mechanism 406 from any of the hosts 402, and ultimately sent to the appropriate storage devices 410 in FIGS. 4A-4B may include any one or more of the processes of method 500. As shown in FIG. 5A, a flowchart of a computer-implemented method 500 for processing I/O requests received at a storage system is shown according to one embodiment. The method 500 may be performed in accordance with the present invention in any of the environments depicted in FIGS. 1-4B, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, each of the nodes 501, 502, 503 shown in the flowchart of method 500 may correspond to one or more processors positioned at a different location in a same data storage system. Moreover, each of the one or more processors are preferably configured to communicate with each other.

In various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 5A includes different nodes 501, 502, 503, each of which represent one or more processors, controllers, computer, etc., positioned at a different location in a same storage system. For instance, node 501 may include one or more processors which are electrically coupled to a switching mechanism which is in communication with at least one host and a plurality of storage devices (e.g., see connection management mechanism 406 of FIG. 4A above). Node 502 may include one or more processors which are electrically coupled to a first storage device, while node 503 may include one or more processors which are electrically coupled to a second storage device (e.g., see storage devices 410 of FIG. 4A above). Accordingly, commands, data, requests, etc. may be sent between each of the nodes 501, 502, 503 depending on the approach. Moreover, it should be noted that the various processes included in method 500 are in no way intended to be limiting, e.g., as would be appreciated by one skilled in the art after reading the present description. For instance, data sent from node 501 to node 502 may be prefaced by a request sent from node 502 to node 501 in some approaches.

As shown, operation 504 of method 500 includes receiving a write request at a storage system. As mentioned above, the write request may be received at an interface of a storage system from a host (e.g., see 400 of FIG. 4A above).

Referring still to FIG. 5A, operation 506 includes determining an intended storage location for data included in the write request. In other words, operation 506 includes determining where the data included in the write request will actually be written in the storage system. Depending on the type of write request received in operation 504 (e.g., update, new write, write append, etc.), the data included in the write request may correspond to a different intended storage location. For instance, the intended storage location for data included in a write request which is an update may be (e.g., correspond to) the storage location of the data being updated. Moreover, the intended storage location may be represented as a physical address in a particular storage device, a logical address which corresponds to a physical address (as identified in a logical-to-physical table), etc.

Operation 508 of method 500 includes determining an intended storage location for parity information which corresponds to the data included in the write request. Parity information may be implemented in storage to protect against data loss. For instance, data which has been lost may be rebuilt using the parity information, thereby avoiding any permanent storage errors. Furthermore, by distributing parity information across different storage components, a storage system may be protected against data loss even if an entire storage device fails. It follows that the intended storage location for parity information may vary depending on the approach. For instance, a RAID scheme implemented by a storage system may define where certain parity information should be stored in the storage system. Moreover, the intended storage location for the parity information may depend on the intended storage location for the data which the parity information corresponds to. According to an example, it may be undesirable to store data and parity information corresponding to the data on the same physical storage device, e.g., as would be appreciated by one skilled in the art after reading the present description. Thus, operation 506 and 508 may desirably determine different intended storage locations for the data and parity information, respectively.

Looking to operation 510, method 500 further includes sending a first copy of the data included in the write request to a first storage device which corresponds to the intended storage location for the data included in the write request. Although not depicted in FIG. 5A, one or more instructions to store the data in memory may be sent to the first storage device along with the first copy of the data.

A second copy of the data included in the write request is also sent to a second storage device which corresponds to the intended storage location for the parity information. See operation 512. Depending on the approach, the intended storage location for the parity information may be implicitly known by the chosen RAID level, the number of storage devices in the RAID array, the stripe size, based on a predetermined parity layout, etc. However, in some approaches the intended storage location for the parity information may also be preconfigured using other processes. In any case, each of the storage devices themselves may know which logical block addresses (LBAs) in memory of the storage devices are intended to store data, and which LBAs are intended to store parity information, although the storage devices may not know to which stripe the parity information belongs in and/or where the corresponding data blocks are stored in the storage system, e.g., as would be appreciated by one skilled in the art after reading the present description.

The first and second copies of the data may be sent to the respective storage devices in parallel. As mentioned above, it is preferred that the parity information is stored in a different physical location (e.g., on a different physical storage device) than the data it corresponds to. As a result, the chances of losing both the data and the parity information corresponding thereto are reduced. It follows that the switching mechanism may be able to achieve dual-casting by sending the parity information as well as the data to the respective storage devices in parallel. Accordingly, operations 510 and 512 may be performed in parallel, and even simultaneously, thereby further increasing the achievable throughput of the storage system.

Referring still to FIG. 5A, one or more instructions to compute the parity information via a decentralized communication link with the remaining storage devices are also sent to the second storage device. See operation 514. The one or more instructions sent in operation 514 may be included in the second copy of the data (e.g., as added metadata), sent separately from the second copy of the data, sent simultaneously and in parallel to the second copy of the data, etc. However, in some approaches the second storage device may be able to initiate computation of the parity information without receiving specific instructions to do so. For instance, a RAID engine included in the second storage device may be able to determine that the memory in the second storage device should store parity information which corresponds to the data included in the write request.

As mentioned above, it may be desirable for the parity information and data to be stored on different storage devices. Accordingly, the first and second storage devices which the first and second copies of the data are sent to in operations 510 and 512 respectively, may be physically different (e.g., separated) storage devices. Despite being different physical storage devices, the first and second storage devices are preferably included in a same storage system. In some approaches, the first and second storage devices may actually be included in a same enclosure (exterior housing) of a same storage system.

As alluded to above, the first and second copies of the data may be sent by a switching mechanism which is capable of connecting multiple inputs to multiple outputs, e.g., such as a crossbar switching module. Accordingly, the first and second copies of the data may be sent to the first and second storage devices in parallel. In some approaches the first and second copies of the data may even be sent to the first and second storage devices simultaneously and in parallel. In some approaches, the sending of the first and second copies simultaneously and in parallel may use multi-cast, broadcast, dual-cast, any-cast, etc., mechanisms. However, in still further approaches the first and second copies of the data may be sent separately, e.g., as desired.

Looking to operation 516 at node 502, the first copy of the data is stored in memory at the intended storage location in the first storage device determined in operation 506. As mentioned above, the first copy of the data may be sent to the first storage device along with one or more instructions which indicate the intended storage location in some approaches. However, the first storage device may be able to determine the intended storage location for the data, e.g., in a same or similar manner as that implemented in operation 506. Thus, in some approaches the first copy of the data may be sent to the first storage device without any instructions indicating where the data should actually be stored in memory.

Operation 518 at node 503 includes using the second copy of the data to calculate the parity information corresponding to the data included in the write request. As mentioned above, each of the storage devices in a given storage system may include a RAID engine (e.g., see 412 of FIG. 4A above). Accordingly, the second storage device may be configured to use a RAID engine to calculate the parity information. Moreover, the second storage device may calculate the parity information via (e.g., using) a decentralized communication link with the other remaining storage devices. As shown in FIG. 4B, parity information may be distributed across the memory of more than one storage device. Thus, the second storage device may communicate with the other storage devices in order to compute the parity information which is to be stored in the second storage device. It should also be noted that because the parity information is actually being calculated at the second storage device, the parity information may be computed in parallel with other operations performed by the storage system. For instance, a third (different) storage device may calculate parity information which corresponds to a separate write request in parallel with the second storage device performing operation 518.

The calculated parity information is further stored in memory of the second storage device. See operation 520. More specifically, the parity information may be stored at the intended storage location for the parity information. Accordingly, the second copy of the data may be sent in operation 512 along with one or more instructions which indicate the intended storage location determined in operation 508. However, the second storage device may be able to determine the intended storage location for the parity information, e.g., according to any of the approaches described above. Accordingly, in some approaches the second storage device may implement the same or similar processes as those implemented in operation 506. In other approaches, the second storage device may calculate the intended storage location of the parity information using the RAID engine. It follows that in some approaches the second copy of the data may be sent to the second storage device without any instructions indicating where the parity information should actually be stored in memory.

In some approaches, the parity information received by the storage device may be an update to existing parity information. Accordingly, the process of storing the parity information in memory may include reading the parity information currently stored in memory. Moreover, the existing parity information may be compared with the parity information received in operation 512 in order to determine which portions of the existing parity information are to be updated, which portions of the newly received parity information are new, and which portions of the existing parity information do not need to be updated. As a result, the amount of processing power consumed while performing the storage process in operation 520 is reduced, thereby increasing efficiency of the storage system. In some approaches, higher-layer software may be used to ensure that old (e.g., outdated) parity information exists in the memory of the storage devices.

It should also be noted that each of the storage devices may include protected RAM (e.g., see 414 in FIG. 4A), such as DRAM. Accordingly, the received parity information may be maintained (e.g., held) in the protected RAM of the storage device until the parity updates for a given stripe are received (e.g., which is typically the case when an LSA is implemented on top of the storage system), or a parity cache manager decides to destage the updated parity information, e.g., as would be appreciated by one skilled in the art after reading the present description. By temporarily storing the parity information in the protected RAM until the parity information is implemented in memory, the received parity information is protected from being lost due to power failures, etc., thereby desirably avoiding write errors, data losses, system delays, data recovery errors, data corruption, etc.

Furthermore, operation 522 includes discarding the second copy of the data. Once the parity information has been stored in memory of the second storage device, the data corresponding thereto may no longer be desired, as the data itself is stored on the first storage device as seen in operation 516. By deleting the second copy of the data, the second storage device is able to free storage space in memory, and avoid unnecessary consumption of storage resources. In some approaches, the second copy of the data may actually be deleted once the parity information has been calculated and temporarily stored in memory (e.g., RAM), thereby further improving efficiency.

It follows that node 501 may simply direct copies of data received to different storage devices in a storage system, whereby the storage devices may process the data themselves. As a result, the storage system is able to function successfully without implementing a centralized storage controller. Rather, a switching mechanism may be used as described above. Thus, the storage system is able to reduce costs per GB and/or per I/O. Moreover, these cost-based improvements are realized by the system in addition to increased achievable throughputs resulting from the added parallelism, the ability to more accurately scale and/or tailor system configurations for a range of applications, etc.

Figure 5B:
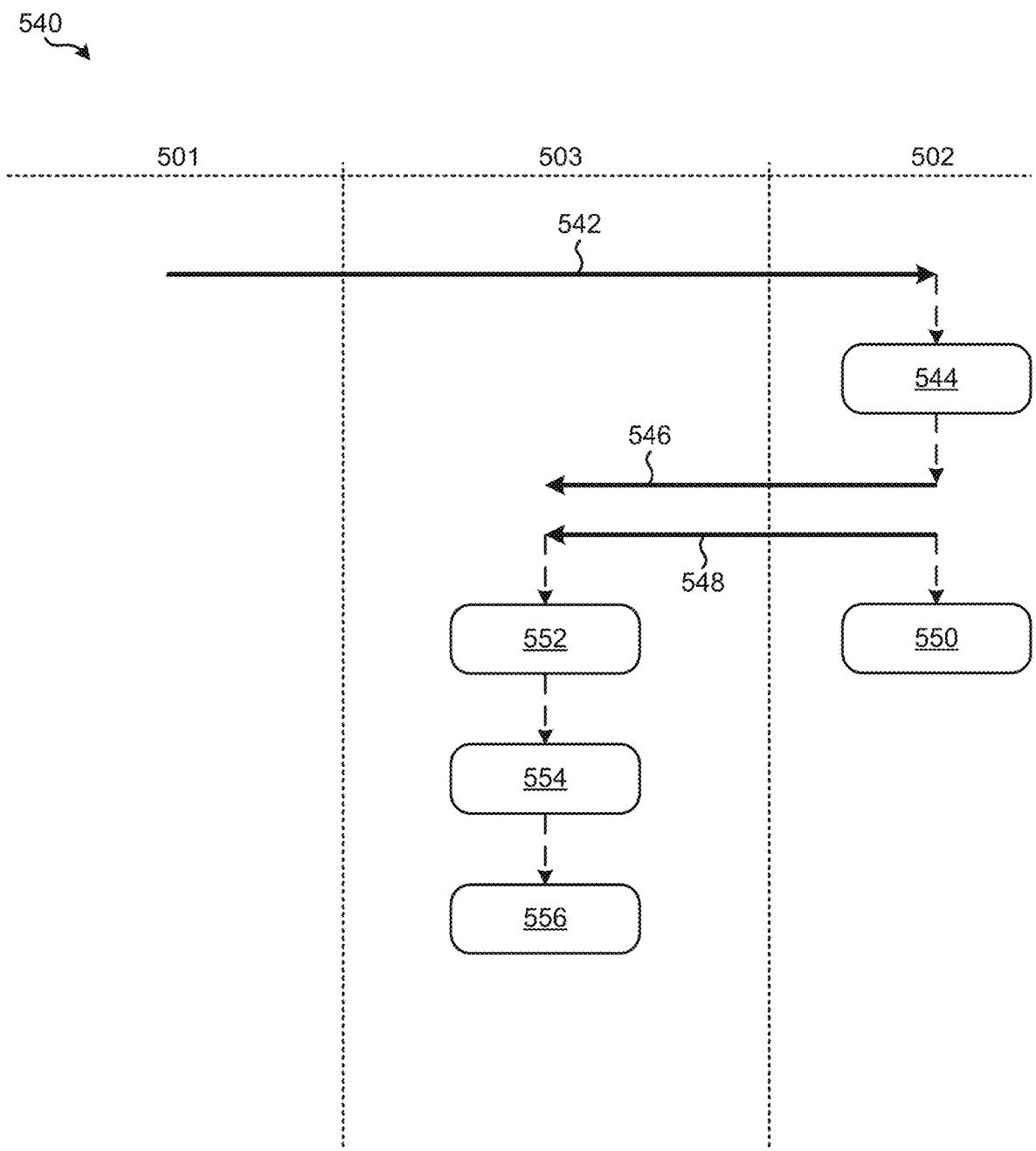
FIG. 5B is a flowchart of a method in accordance with one embodiment.

Although FIG. 5A illustrates an embodiment in which copies of the same data are sent to different storage devices from a switching mechanism depending on intended storage locations of the data and the parity information determined at the switching mechanism, write requests may be processed differently in other embodiments. For instance, in some approaches the switching mechanism may not be able to perform dual-casting and/or multi-casting write operations. Accordingly, FIG. 5B illustrate variations of the embodiment of FIG. 5A depicting several exemplary processes of a method 540 performed by any suitable component at each of the nodes 501, 502, 503. Accordingly, nodes 501, 502, 503 have common numbering with those of FIG. 5A, and may incorporate any of the approaches described above.

Referring still to FIG. 5B, operation 542 includes receiving a write request at a first storage device. As mentioned above, each of the storage devices in a same storage system may be in communication with a switching mechanism. Accordingly, the first storage device may receive the write request (or at least the data which corresponds to a write request) from a switching mechanism at node 501. The switching mechanism may send the write request to the first storage device in response to determining that the first storage device corresponds to an intended storage location for the data included in the write request (e.g., as described above in operation 506 of FIG. 5A).

The first storage device receiving the write request may thereby be used to initiate a parity updated procedure by determining the intended storage location for the parity information, and the corresponding storage device. The first storage device may be able to communicate with other storage devices in the storage system through the switching mechanism. However, in other approaches at least some of the storage devices in a same storage system may also be able to communicate with each other directly (e.g., via a wireless and/or wired connection) in some approaches.

Upon receiving the write request, the first storage device may determine an intended storage location in a second storage device for parity information which corresponds to data included in the write request. See operation 544. As mentioned above, the second storage device is preferably one of the other storage devices in the same storage system which is in communication with the first storage device, either directly, or through the switching mechanism. Moreover, the first storage device may determine the intended storage location in the second storage device by evaluating the data included in the received write request, metadata included in the received write request, using the RAID engine in the first storage device, etc., as would be appreciated by one skilled in the art after reading the present description.

Operation 546 further includes sending a copy of the data included in the write request to the second storage device or, in case of an in-place stripe update, the difference between the new and old data version. One or more instructions to compute the final parity information may also be sent to the second storage device. See operation 548. As mentioned above, the one or more instructions may be sent to the second storage device via a decentralized communication link which extends between the first storage device and the remaining storage devices in the storage system. The one or more instructions sent in operation 548 may be included in the copy of the data (e.g., as added metadata), sent separately from the copy of the data, sent simultaneously and in parallel to the copy of the data, etc. However, in some approaches the second storage device may be able to initiate computation of the parity information without receiving specific instructions to do so. For instance, a RAID engine included in the second storage device may be able to determine that the memory in the second storage device should store parity information which corresponds to the data included in the write request received at the first storage device.

With continued reference to FIG. 5B, operation 550 includes storing the data included in the write request in the non-volatile memory of the first storage device. However, the first storage device does not store parity information which corresponds to the data included in the received write request. By delegating parity information calculations and storage to a second storage device, the first storage device is able to improve achievable throughputs of the storage system as a whole by increasing parallelism. Again, because the parity information is actually being calculated at the second storage device, the first and second storage devices may perform their respective data processing operations in parallel. Thus, the parity information may be computed in parallel, and even simultaneously, with the first storage device storing the data included in the received write request. Additional I/O requests may even be processed by other storage devices in parallel with the write request received by the first storage device.

Accordingly, looking to operation 552 at node 502, the second storage device uses the copy of the data received from the first storage device to calculate the parity information which corresponds to the data included in the write request. Again, a RAID engine included in the second storage device may be used to calculate the parity information in some approaches. Moreover, operation 554 includes storing the calculated parity information in memory of the second storage device, while operation 556 includes the discard of the copy of the data received from the first storage device. It follows that the second storage device is preferably only used to store parity information corresponding to the data in the write request received at the first storage device, but none of the actual data itself. In other words, the memory in the second storage device is not being used to perform a data mirroring processes, e.g., as would be appreciated by one skilled in the art after reading the present description. However, this is in no way intended to imply that the second storage device does not include any actual data stored in the memory thereof. For instance, the intended storage location for data corresponding to other write requests received may be in the memory of the second storage system.

While the various processes implemented in FIGS. 5A-5B above may be implemented in order to achieve significant improvements during normal operation of storage systems, these embodiments are also able to adapt to different situations as they arise. For instance, a storage failure may occur at any point while processing I/O requests received from a host. Looking now to FIG. 6A, a method 600 for responding to an experienced failure condition is illustrated in accordance with one embodiment. Accordingly, any one or more of the processes included in method 600 may be performed in response to detecting a storage device failure, a read error, etc., in a storage system which may be performing method 500 and/or 540.

Each of the steps of the method 600 may be performed by any suitable component of the operating environment. Accordingly, each of the nodes 601, 602, 603, 604 shown in the flowchart of method 600 may correspond to one or more processors positioned at a different location in a distributed data storage system. For example, any one or more of the processes included in method 600 may be performed by storage devices, management modules, host drivers, etc., depending on the desired approach. Moreover, each of the one or more processors are preferably configured to communicate with each other. However, it is preferred that the processes included in a data recovery procedure are local to the storage system itself. In other words, it is preferred that the data recovery procedure is performed such that the data rebuild traffic is internal to the storage system enclosure. This desirably allows data to be recovered transparently with respect to the hosts, while also minimizing overhead as the internal bandwidth and latency between the storage devices in the storage system are significantly more efficient in comparison to the bandwidth and latency experienced between the hosts and the storage devices themselves. In other words, data recovery is preferably performed internally with respect to the storage system enclosure and does not involve sending data outside the enclosed storage system environment. This utilization of internal bandwidth is also desirable as it desirably reduces the user observed rebuild impact.

In various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 6A includes different nodes 601, 602, 603, 604, each of which represent one or more processors, controllers, computer, etc., positioned at a different location in a distributed data storage system. For instance, node 601 may include one or more processors which are electrically coupled to a switching mechanism which is in communication with at least one host and a plurality of storage devices (e.g., see connection management mechanism 406 of FIG. 4A above). Node 602 may include one or more processors which are electrically coupled to a first storage device, node 603 may include one or more processors which are electrically coupled to a second storage device, and node 604 may include one or more processors which are electrically coupled to a third storage device (e.g., see storage devices 410 of FIG. 4A above). Accordingly, commands, data, requests, etc. may be sent between each of the nodes 601, 602, 603, 604 depending on the approach. Moreover, it should be noted that the various processes included in method 600 are in no way intended to be limiting, e.g., as would be appreciated by one skilled in the art after reading the present description. For instance, data sent from node 601 to node 602 may be prefaced by a request sent from node 602 to node 601 in some approaches.

As shown, operation 606 of method 600 includes detecting the failure of a storage device. In different approaches, the failure event may be detected in response to determining that a memory component in a storage device has failed, experiencing a read error (e.g., due to a faulty media block), experiencing a timeout delay in response to a request sent, etc. For instance, in some approaches a failure event may be detected by the switching mechanism of the storage system in response to experiencing a timeout condition, receiving an error message, detecting a heartbeat message, determining a communication link failure exists, etc. In other approaches, any of the components included in the storage system (e.g., one or more management modules, storage devices, interfaces, etc.) may be used to detect the failure event in response to any of the foregoing situations. According to an example, which is in no way intended to limit the invention, one or more of the management modules in the storage system may perform background data scrubbing to detect media errors at the storage devices and may trigger a localized stripe rebuild and/or a global rebuild of all stripes in response to detecting one or more media errors.

Moreover, depending on the type of failure event detected and/or a location at which the failure event occurred (e.g., a specific storage device), different actions may be taken in an attempt to overcome the failure event. For example, storage systems having more than one storage device preferably reserve space in memory which is not considered while performing normal write operations. In other words, storage systems may allocate certain portions of memory which are reserved for situations in which data reconstruction is desired, e.g., following a failure event. Accordingly, operation 608 includes sending one or more instructions to rebuild the data stored in the failed storage device. The one or more instructions sent in operation 608 may be sent to one or more storage devices having spare (unused and reserved) storage space.

Figure 6A:
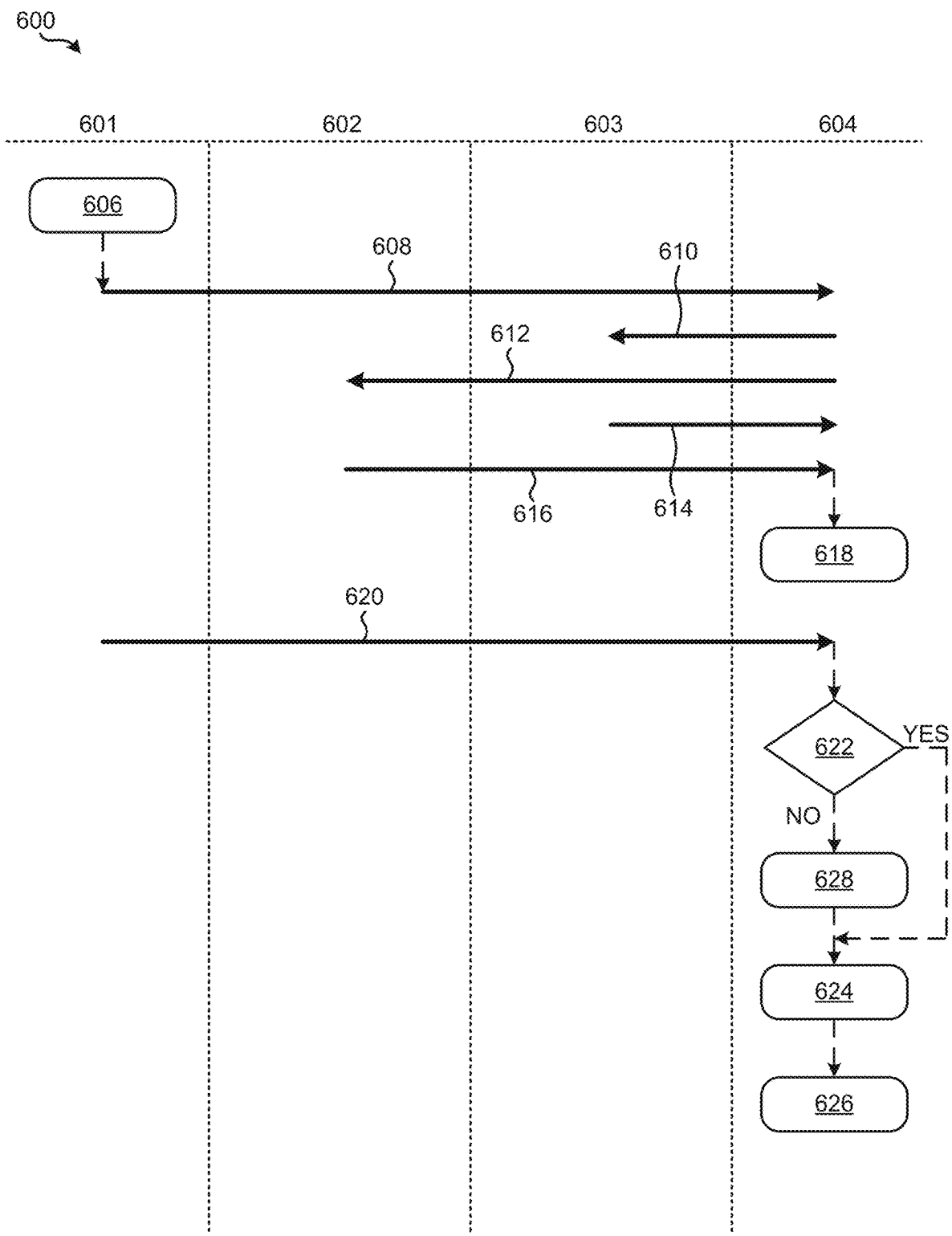
FIG. 6A is a flowchart of a method in accordance with one embodiment.
Figure 6B:
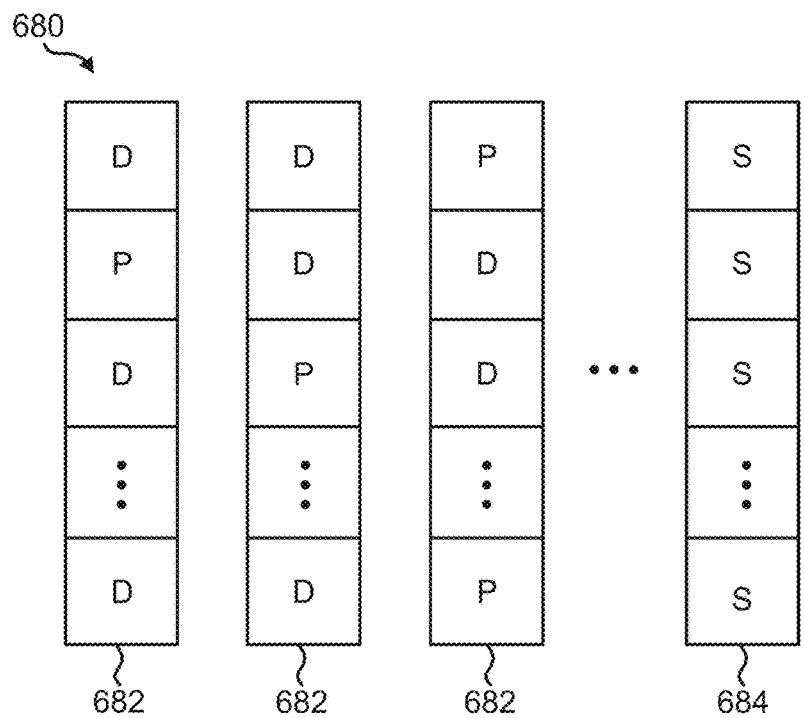
FIG. 6B is a representational view of data stored in storage devices of a storage system in accordance with one embodiment.
Figure 6C:
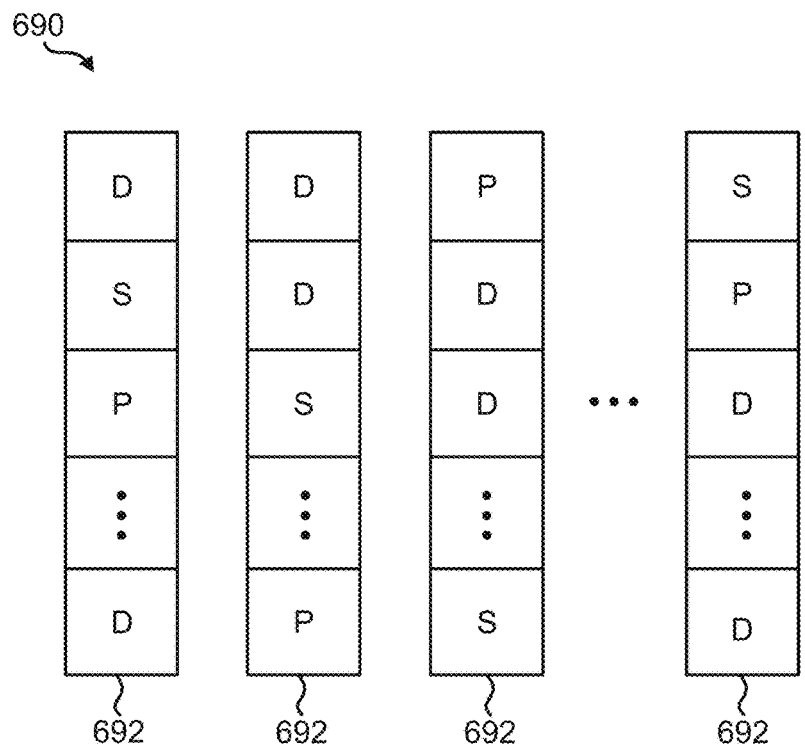
FIG. 6C is a representational view of data stored in storage devices of a storage system in accordance with one embodiment.

Referring momentarily to FIGS. 6B-6C, storage systems 680, 690 which implement two different spare storage space configurations in the context of a RAID-5 scheme, are illustrated in accordance with two embodiments. As an option, the present storage systems 680, 690 may be implemented in conjunction with features from any other embodiment listed herein, such as those described with reference to the other FIGS., such as FIG. 6A. However, such storage systems 680, 690 and others presented herein may be used in various applications and/or in permutations which may or may not be specifically described in the illustrative embodiments listed herein. Further, the storage systems 680, 690 presented herein may be used in any desired environment. Thus FIGS. 6B-6C (and the other FIGS.) may be deemed to include any possible permutation.

Looking first to FIG. 6B, the storage system 680 includes a plurality of storage devices 682 which are used to store both parity information P and data D. The storage system 680 also includes a dedicated storage device 684 which is not used to store parity information or data during normal operations. However, the spare storage S in the dedicated storage device 684 may be used in response to experiencing a failure event. As a result, the dedicated storage device 684 may be used to rebuild data without impacting performance of the remainder of the storage system 680. Moreover, a recovery procedure may be initiated following a failure event without first having to create free space in memory to perform the operations of the recovery procedure.

The spare storage space configuration illustrated in the storage system 680 of FIG. 6C differs in that the spare storage S is distributed (e.g., rotated) among the different storage devices 692. Accordingly, parity information P, data D, and spare storage S is stored in each of the storage devices 692. A table may be used to keep track of which portions of memory in each of the storage devices 692 are reserved for spare storage S, and which portions of memory are available to store parity information P and data D.

The distributed scheme of the spare storage depicted in the storage system 690 of FIG. 6C may be preferred in certain situations. For instance, having distributed spare storage allows for data rebuilds to be performed faster, as different storage devices are able to reconstruct data in parallel. Moreover, the bandwidth of numerous storage devices may be utilized during normal processing, thereby avoiding situations in which storage devices are waiting idly. Further still, for approaches implementing Flash memory, wear leveling may be distributed across more storage devices, while the spare capacity available increases the over-provisioning of each storage device.

Returning to FIG. 6A, the one or more instructions sent in operation 608 are shown as being sent to node 604. It follows that memory included in the third storage device at node 604 includes enough available (unused) spare storage space therein to rebuild the data stored in the failed storage device. The third storage device may also be configured to extract data and parity information from the other storage devices in order to rebuild the data stored on the failed storage device. Accordingly, the third storage device is also preferably configured to use the extracted data and parity information to reconstruct the data stored in the failed storage device.

Upon receiving the one or more instructions to rebuild data stored in the failed storage device, the third storage device may send a request to the other storage devices for any parity information and/or data which corresponds to the failed storage device. See operations 610, 612. It follows that a request for data and/or parity information may not be sent to the failed storage device, thereby conserving system resources as the failed storage device may not be able to reply to the request anyway.

Looking to operations 614 and 616, data and/or parity information which corresponds to the data stored in the failed storage device is received in response to the requests sent in operations 610, 612 respectively. Furthermore, operation 618 includes using the received data and/or parity information to rebuild the data stored in the failed storage device. As described above, the data rebuild is performed in (e.g., using) the spare storage space in the third storage device.

During the data recovery procedure, additional I/O requests may be received by the storage system. According to some approaches, the switching mechanism may receive I/O requests from one or more hosts. Due to the distributed nature of the storage system, I/O requests received may be directed (sent) to the corresponding storage devices. According to some approaches, a global stripe layout may be used to direct each of the I/O requests to the appropriate storage device. However, directing each of the received I/O requests may be performed according to any of the approaches described above in methods 500, 540. The respective storage devices may thereby perform the various I/O requests in parallel with the data recovery procedure. In other words, at least a portion of method 600 may be performed in parallel with method 500 and/or method 540.

However, I/O requests which correspond to the failed storage device may not be performed by the failed storage device. Accordingly, operation 620 includes redirecting received I/O requests to the one or more storage devices having the spare storage space where the data stored in the failed storage device is being rebuilt according to the data recovery procedure. In another embodiment, the request may also be redirected to another storage device. For example, the request may also be redirected to the one or more storage devices holding the parity information. It should be noted that the specific placement of operation 620 in FIG. 6A is in no way intended to limit the invention. Rather, an I/O request corresponding to the data stored in the failed storage device may be received at any point during the recovery procedure. Accordingly, decision 622 determines whether the data corresponding to the I/O request (e.g., read request) redirected in operation 620 has been successfully rebuilt in the one or more storage devices having spare storage space. Thus, according to the present embodiment, decision 622 determines whether the I/O request redirected to the third storage device in operation 620 may be performed.

Method 600 proceeds to operation 624 in response to determining that the data corresponding to the read request has been successfully rebuilt in the spare storage space, and therefore that the redirected I/O request may be performed. There, operation 624 includes using the data corresponding to the I/O request to perform the I/O request. For example, the I/O request may be a read request, whereby operation 624 may include reading the data corresponding to the read request from memory of the third storage device.

From operation 624, the flowchart proceeds to operation 626, whereby method 600 may end. However, it should be noted that although method 600 may end upon reaching operation 626, any one or more of the processes included in method 600 may be repeated in order to perform additional I/O requests. In other words, any one or more of the processes included in method 600 may be repeated for in order to perform subsequently received I/O requests.

However, information may be sent back to the switching module following operation 624 in some approaches. For instance, certain types of I/O requests performed may involve sending information to the switching module. In one example, the I/O request performed in operation 624 may be a read request, whereby the data read is preferably sent to the switching module. Upon receiving the read data, the switching module may satisfy the read request by delivering (e.g., sending) the data to a host which issued the read request. In other approaches the I/O request performed in operation 624 may be a write request, whereby a confirmation that the write request has been successfully performed is preferably sent to the switching module, e.g., to be delivered to a host which issued the write request.

Returning to decision 622, method 600 proceeds to operation 628 in response to determining that the data corresponding to the I/O request has not been successfully rebuilt in the spare storage space, and therefore that the redirected I/O request may not be performed yet. There, operation 628 includes prioritizing the rebuild of the data corresponding to the I/O request. As a result, the data which corresponds to the I/O request may jump to the front of a repair queue, immediately begin to be repaired, be flagged, etc. As a result, a RAID engine of the storage device may read the pertinent data and parity information from the respective storage devices, reconstruct the failed data, and return the reconstructed data to the host. Accordingly, once the data corresponding to the I/O request has been successfully rebuilt, method 600 proceeds to operation 624.

The third storage device may be configured to detect when the data corresponding to the I/O request has successfully been repaired. Moreover, in some approaches the storage device having the spare storage may use an E-page pattern stored in the unused spare space and/or have the spare space unmapped in order to detect whether the spare space is still free (e.g., available) before attempting to use the spare space to reconstruct data, thereby avoiding from overwriting data.

In other embodiments, decision 622 may be performed by the switching mechanism at node 601, whereby the I/O request may only be redirected to the third storage module in response to determining that the corresponding data has been successfully rebuilt. The alternate outcome of decision 622 may result in instructions which prioritize the rebuild of the data corresponding to the I/O request being sent to the third storage module.

However, as mentioned above, at least some of the processed operations included in the data recovery procedure may be performed by one or more management modules of the storage system. For instance, in some embodiments the data rebuild procedure is performed by the management modules themselves. Such a design allows the implementation of the storage devices to be simplified, while also allowing data recovery to be performed internal to the storage system itself. These performance based improvements may be achieved in response to the switching component redirecting I/O requests pertaining to data stored in a failed storage device to one or more of the management modules. The one or more management modules then rebuild the unavailable data by implementing various ones of the approaches described above, and return the recovered data to the host which issued the I/O request (particularly when the I/O request is a read requests). This also allows for the recovered data to be written to memory in parallel with satisfying the I/O request.

Figure 7:
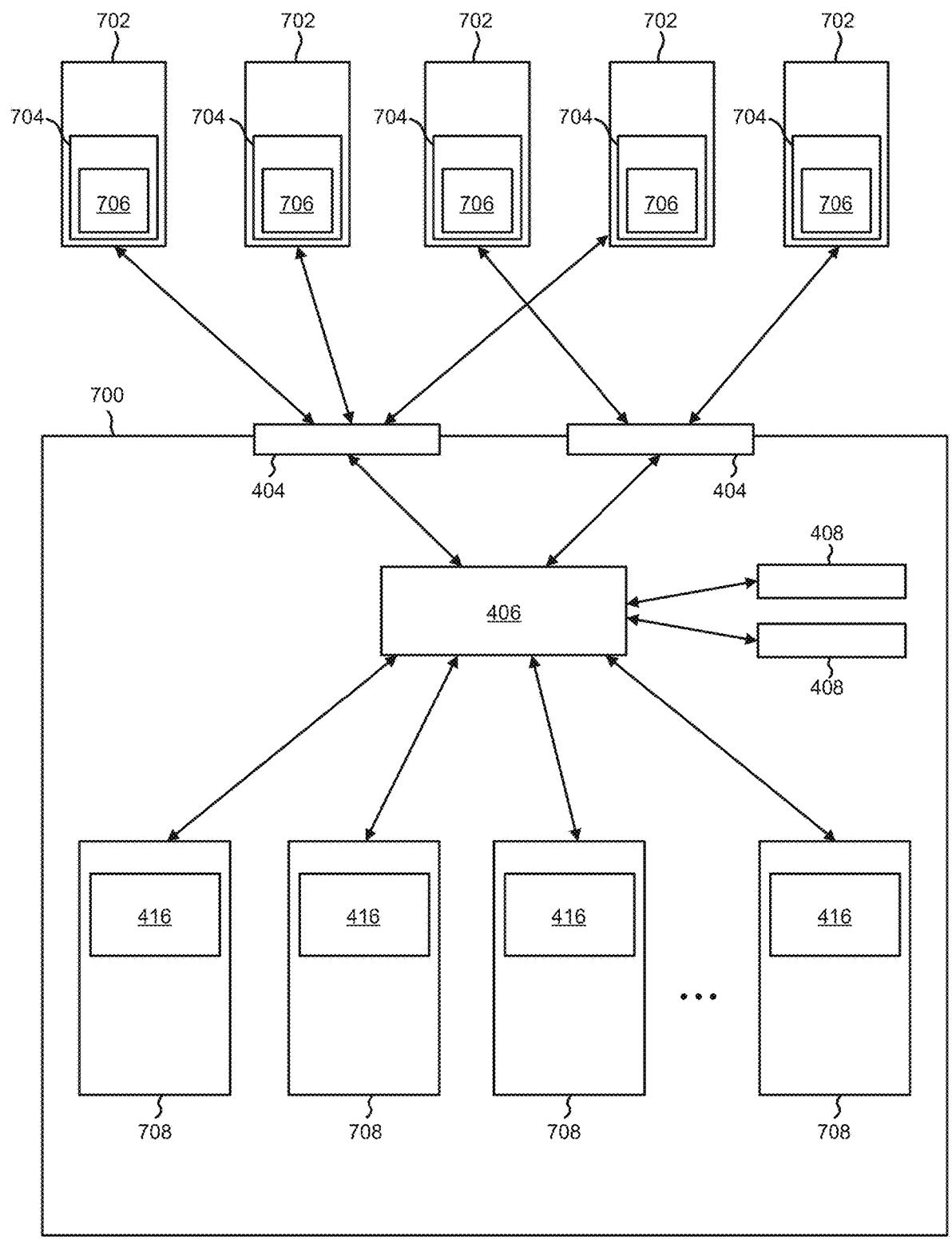
FIG. 7 is a representative view of a decentralized storage system having hosts connected thereto, in accordance with one embodiment.

Looking to FIG. 7, a representative view of the architecture for an exemplary storage system 700 is illustrated in accordance with one embodiment. Specifically, FIG. 7 illustrates variations of the embodiment of FIGS. 4A-4B depicting several exemplary configurations within a storage system 700 and the hosts 702 connected thereto. Accordingly, various components of FIG. 7 have common numbering with those of FIGS. 4A-4B.

As an option, the present storage system 700 may be implemented in conjunction with features from any other embodiment listed herein, such as those described with reference to the other FIGS. However, such storage system 700 and others presented herein may be used in various applications and/or in permutations which may or may not be specifically described in the illustrative embodiments listed herein. Further, the storage system 700 presented herein may be used in any desired environment. Thus FIG. 7 (and the other FIGS.) may be deemed to include any possible permutation. Moreover, it should be noted that the number of each type of component included in the embodiment illustrated in FIG. 7 is in no way intended to be limiting, but rather has been presented by way of example.

In the embodiment depicted in FIG. 7, each of the multiple hosts 702 which are coupled to the interface modules 404 of the storage system 700 may include a dedicated storage driver 704 and/or a RAID engine 706. As mentioned above, the hosts 702 may also be coupled to the interface modules 404 of the storage system 700 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Although not shown, in some approaches one or more of the hosts 702 may be coupled to the interface modules 404 of the storage system 700 over a network of any desired type, e.g., such as a WAN, LAN, SAN, etc.

Looking to the plurality of storage devices 708 coupled to the connection management mechanism 406, each of the storage devices 708 are only depicted as including non-volatile memory 416. It follows that each of the hosts 702 have effectively taken on the parity-based functionality which was implemented by each of the storage devices in the approaches which correspond to FIGS. 4A-5 above. Accordingly, each of the hosts 702 in FIG. 7 may be configured to use the RAID engine 706 to calculate parity information which corresponds to data generated and/or received by the respective host 702. The hosts 702 may be able to calculate the parity information by using a decentralized communication link with the other hosts 702 and/or the storage devices 708 themselves. For instance, parity information may be distributed across the memory of more than one of the storage devices 708. Thus, the hosts 702 may communicate with the storage devices 708 in order to determine which parity information is to be stored in each of the storage devices 708. It should also be noted that because the parity information is actually being calculated at one or more of the hosts 702, the parity information may be computed in parallel with other operations performed by the storage system 700. For instance, each of the hosts 702 may be calculating parity information which corresponds to separate write requests in parallel. Furthermore, any of the storage devices 708 may be satisfying read and/or write requests while one or more of the hosts 702 compute parity information.

Moreover, each of the hosts 702 may be able to determine the intended storage location for data and/or parity information which corresponds thereto, e.g., using any of the approaches described above. For instance, a host 702 may be able to evaluate the data included in a given write request before it is issued, metadata included in the write request, using the respective RAID engine 706, etc., as would be appreciated by one skilled in the art after reading the present description. For instance, the RAID engine 706 included in the host 702 may be able to determine that the memory in a specific one of the storage devices 708 should store parity information which corresponds to the data included in a write request being sent to the storage system 700. Moreover, certain aspects of the alternate functionality illustrated in FIG. 7 may be implemented in software, e.g., as would be appreciated by one skilled in the art after reading the present description.

Again, although various components are illustrated as being included in FIG. 7, it should be noted that the storage system 700 does not include a centralized storage controller. As mentioned above, conventional products which rely on centralized storage controllers experience performance setbacks, particularly as achievable data rates continue to increase. Rather, the connection management mechanism 406 may be used to direct I/O requests received from the various hosts 702 to the appropriate storage devices 708.

It follows that the process by which I/O requests are sent to the connection management mechanism 406 from any of the hosts 702, and ultimately directed to the appropriate storage devices 708 in FIG. 7 may incorporate any one or more of the processes of method 500 above. For example, the RAID engine 706 in a host 702 may compute the parity information for data which corresponds to a write request being sent to a storage device 708 in the storage system 700. The RAID engine 706 may also be used to determine an intended storage location of the parity information and/or the data corresponding to the write request. Thereafter, the parity information and data corresponding to the write request may be received by the connection management mechanism 406 through the interface module 404, whereby the connection management mechanism 406 may direct the parity information to its intended storage location in one of the storage devices 708, and direct the data corresponding to the write request to its intended storage location in another of the storage devices 708.

Parity information can be destaged to the storage devices either incrementally (e.g., after each data block is added to a stripe) or can be destaged only once the stripe is finalized. Destaging parity incrementally may ensure that all data in-flight can be reconstructed in case of a failure, however, it comes at the cost of multiple writes to the storage device holding the parity. The cost of the extra parity writes may be reduced by caching temporary parity data in some non-volatile memory in the storage devices.

To avoid concurrent stripe updates from multiple hosts, additional logic may be implemented in each of the drivers 704 in the hosts 702 to ensure that a given stripe in memory 416 of the storage devices 708 is only modified by one host 702 at the time. This may be achieved, for instance, by having dedicated volumes and/or a log-structured way of writing data to memory 416 in the storage system. Alternatively, the storage system 700 or the dedicated storage drivers 704 themselves may use a distributed locking mechanism and/or protocol, a centralized locking manger in the storage system 700 (not shown), or a combination thereof to ensure updates to stripes are serialized properly. An additional benefit of a log-structured array approach to writing data is that the hosts 702 do not need to update existing stripes, which would involve reading existing data and/or parity information. However, any type of data management schemes which would be apparent to one skilled in the art after reading the present description may be implemented.

The embodiments described herein are thereby able to achieve data distribution across the array of storage devices in a storage system while also implementing a successful data redundancy scheme. Thus, some of the embodiments included herein are able to efficiently restore lost data in the event of a failure.

It follows that various ones of the embodiments included herein are able to physically separate the organization of data stripes in memory from the parity calculation process. Doing so allows the storage system to distribute the parity calculation to the appropriate storage devices without implementing a centralized storage controller. In other approaches, the parity calculations may be performed directly at a host using a dedicated storage driver and RAID engine therein. As a result, embodiments included herein are able to efficiently and accurately store data in a decentralized storage system without implementing centralized parity calculations in storage controllers. The storage system is thereby able to achieve higher aggregate performance while also desirably accomplishing lower costs per GB and per I/O.

These embodiments differ greatly from conventional products which rely on one or more storage controllers, because storage controllers attempt to cache write requests into memory and assemble write stripes accordingly. Again, some of the embodiments included herein differ in that the parity update responsibility is pushed down to the storage devices, which are able to detect that a parity update has been received, retrieve the previous parity information for that particular stripe, XOR the old parity with the parity update, and then store the resulting parity information. Moreover, this parity information may be cached in a RAM buffer before it is actually written to prevent data loss.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving a write request at a storage system, wherein the storage system includes more than one storage device;
determining a storage location for data included in the write request;
determining a storage location for parity information corresponding to the data included in the write request;
sending a first copy of the data included in the write request to a first storage device which corresponds to the storage location for the data included in the write request;
sending a second copy of the data included in the write request to a second storage device which corresponds to the storage location for the parity information;
sending one or more instructions to the second storage device to compute the parity information via a decentralized communication link with the remaining storage devices;
detecting a failure of one of the storage devices;
sending one or more instructions to rebuild data stored in the failed storage device, the one or more instructions being sent to one or more storage devices having spare storage space;
receiving a read request which corresponds to the data stored in the failed storage device;
determining whether the data stored in the failed storage device which corresponds to the read request has been rebuilt in the one or more storage devices having spare storage space;
sending one or more instructions to prioritize rebuilding the data stored in the failed storage device which corresponds to the read request in response to determining that the data stored in the failed storage device which corresponds to the read request has not been rebuilt, the one or more instructions being sent to the one or more storage devices having the spare storage space; and
redirecting the read request to storage devices having the rebuilt data in response to the data stored in the failed storage device which corresponds to the read request being rebuilt,
wherein the first storage device is different than the second storage device,
wherein each of the storage devices includes a RAID engine,
wherein each of the storage devices are configured to use the respective RAID engine to calculate parity information for the data included in the write request.

2. The computer-implemented method of claim 1, wherein the operations are performed by a crossbar switching module, wherein the storage system does not include a storage controller.

3. The computer-implemented method of claim 1, comprising:
redirecting received input/output requests to the one or more storage devices having the spare storage space.

4. The computer-implemented method of claim 3, comprising:
redirecting the read request to storage devices having the rebuilt data in response to determining that the data stored in the failed storage device which corresponds to the read request has been rebuilt;
receiving the data which corresponds to the read request; and
satisfying the read request.

5. The computer-implemented method of claim 1, wherein the second storage device uses the second copy of the data to calculate the parity information corresponding to the data included in the write request, stores the calculated parity information in memory of the second storage device, and discards the second copy of the data.

6. A computer program product comprising a computer readable storage medium having program instructions embodied therewith, wherein the computer readable storage medium is not a transitory signal per se, the program instructions readable and/or executable by a processor to cause the processor to perform a method comprising:

receiving, by the processor, a write request at a storage system, wherein the storage system includes more than one storage device;

determining, by the processor, a storage location for data included in the write request;

determining, by the processor, a storage location for parity information corresponding to the data included in the write request;

sending, by the processor, a first copy of the data included in the write request to a first storage device which corresponds to the storage location for the data included in the write request;

sending, by the processor, a second copy of the data included in the write request to a second storage device which corresponds to the storage location for the parity information;

sending, by the processor, one or more instructions to the second storage device to compute the parity information via a decentralized communication link with the remaining storage devices;

sending, by the processor, one or more instructions to rebuild data stored in a failed one of the storage devices, the one or more instructions being sent to one or more storage devices having spare storage space;

receiving, by the processor, a read request which corresponds to the data stored in the failed storage device;

determining, by the processor, whether the data stored in the failed storage device which corresponds to the read request has been rebuilt in the one or more storage devices having spare storage space;

sending, by the processor, one or more instructions to prioritize rebuilding the data stored in the failed storage device which corresponds to the read request in response to determining that the data stored in the failed storage device which corresponds to the read request has not been rebuilt, the one or more instructions being sent to the one or more storage devices having the spare storage space;

redirecting, by the processor, the read request to storage devices having the rebuilt data in response to the data stored in the failed storage device which corresponds to the read request being rebuilt;

receiving, by the processor, the data which corresponds to the read request; and satisfying, by the processor, the read request, wherein the first storage device is different than the second storage device, wherein each of the storage devices includes a RAID engine.

7. The computer program product of claim 6, wherein each of the storage devices is configured to use the respective RAID engine to calculate parity information for the data included in the write request.

8. The computer program product of claim 6, wherein the operations are performed by a crossbar switching module, wherein the storage system does not include a storage controller.

9. The computer program product of claim 6, the program instructions readable and/or executable by the processor to cause the processor to perform the method comprising:

detecting, by the processor, the failure of the one of the storage devices; and redirecting, by the processor, received input/output requests to the one or more storage devices having the spare storage space.

10. The computer program product of claim 9, the program instructions readable and/or executable by the processor to cause the processor to perform the method comprising:

redirecting, by the processor, the read request to storage devices having the rebuilt data in response to determining that the data stored in the failed storage device which corresponds to the read request has been rebuilt.

11. The computer program product of claim 6, wherein the second storage device uses the second copy of the data to calculate the parity information corresponding to the data included in the write request, stores the calculated parity information in memory of the second storage device, and discards the second copy of the data.

12. A computer-implemented method, comprising:

receiving a write request at a first storage device, wherein the first storage device is in communication with a switching mechanism and a plurality of other storage devices;

determining a storage location in a second storage device for parity information which corresponds to data included in the write request, wherein the second storage device is one of the plurality of other storage devices in communication with the first storage device;

sending a copy of the data included in the write request to the second storage device;

sending one or more instructions to the second storage device to compute the parity information via a decentralized communication link with the first storage device and the remaining storage devices;

storing the data included in the write request in memory of the first storage device;

receiving one or more instructions at the first storage device to rebuild data stored in a failed one of the plurality of other storage devices;

receiving data and parity information which corresponds to the data stored in the failed storage device, the data and parity information being received from the remaining ones of the plurality of other storage devices;

using the received data and parity information to rebuild the data stored in the failed storage device;

receiving a read request which corresponds to the data stored in the failed storage device;

determining whether the data corresponding to the read request has been rebuilt in the failed storage device;

prioritizing the rebuild of the data corresponding to the read request in response to determining that the data corresponding to the read request has not been rebuilt in the failed storage device; and reading the data corresponding to the read request in response to the data corresponding to the read request being rebuilt in the failed storage device, wherein the first storage device does not store any parity information which corresponds to the data included in the write request, wherein each of the storage devices includes a RAID engine.

13. The computer-implemented method of claim 12, wherein determining the storage location for the parity information is performed using the RAID engine included in the first storage device, wherein the write request is received from the switching mechanism, wherein the switching mechanism is a crossbar switching module, wherein the crossbar switching module and the storage devices are included in a same storage system, wherein the storage system does not include a storage controller.

14. The computer-implemented method of claim 12, wherein the second storage device uses the copy of the data to calculate the parity information which corresponds to the data included in the write request, stores the calculated parity information in memory of the second storage device, and discards the copy of the data.

15. The computer-implemented method of claim 12, comprising:
receiving input/output requests which correspond to the data stored in the failed storage device, wherein the first storage device has spare storage space.

16. The computer-implemented method of claim 15, comprising:
reading the data corresponding to the read request in response to determining that the data corresponding to the read request has been rebuilt in the spare storage space.

\* \* \* \* \*